United States Patent
Stiesdal

(10) Patent No.: US 8,575,809 B2
(45) Date of Patent: Nov. 5, 2013

(54) STATOR FOR AN ENERGY CONVERTING APPARATUS AND ENERGY CONVERTING APPARATUS USING THE SAME

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 306 days.

(21) Appl. No.: 13/031,348

(22) Filed: Feb. 21, 2011

(65) Prior Publication Data

US 2011/0210558 A1   Sep. 1, 2011

(30) Foreign Application Priority Data

Feb. 26, 2010   (EP) ..................................... 10154877

(51) Int. Cl.
*H02K 3/12*   (2006.01)

(52) U.S. Cl.
USPC .......................................... 310/180; 310/200

(58) Field of Classification Search
USPC ........................... 310/179, 180, 189, 200, 208
See application file for complete search history.

(56) References Cited

U.S. PATENT DOCUMENTS

| | | | | |
|---|---|---|---|---|
| 2,085,099 A | * | 6/1937 | Jones | 310/225 |
| 5,903,082 A | * | 5/1999 | Caamano | 310/216.001 |
| 5,955,808 A | * | 9/1999 | Hill | 310/180 |
| 6,281,612 B1 | * | 8/2001 | Asao et al. | 310/179 |
| 7,550,892 B2 | * | 6/2009 | Hsu | 310/216.086 |
| 2007/0089284 A1 | * | 4/2007 | Bullock et al. | 29/596 |
| 2008/0231132 A1 | * | 9/2008 | Minowa et al. | 310/114 |

FOREIGN PATENT DOCUMENTS

| | | | |
|---|---|---|---|
| EP | 2017854 A1 | | 1/2009 |
| JP | 2004180396 A | * | 6/2004 |

* cited by examiner

*Primary Examiner* — Tran Nguyen
*Assistant Examiner* — Naishadh Desai

(57) ABSTRACT

It is described a stator for an energy converting apparatus, the stator comprising the stator including a support structure having an annular shape around an axial direction; a first protrusion coupled to the support structure and extending radially from the support structure; a second protrusion coupled to the support structure and extending radially from the support structure, the second protrusion being spaced apart from the first protrusion in a circumferential direction; and a first wire arranged between the first protrusion and the second protrusion in a plurality of first radial layers located at different radial positions and configured such that a circumferential extent of a cross-sectional area of the first wire increases radially outwards. Further is described an energy converting apparatus including the stator, and a wind turbine including the energy converging apparatus.

3 Claims, 3 Drawing Sheets

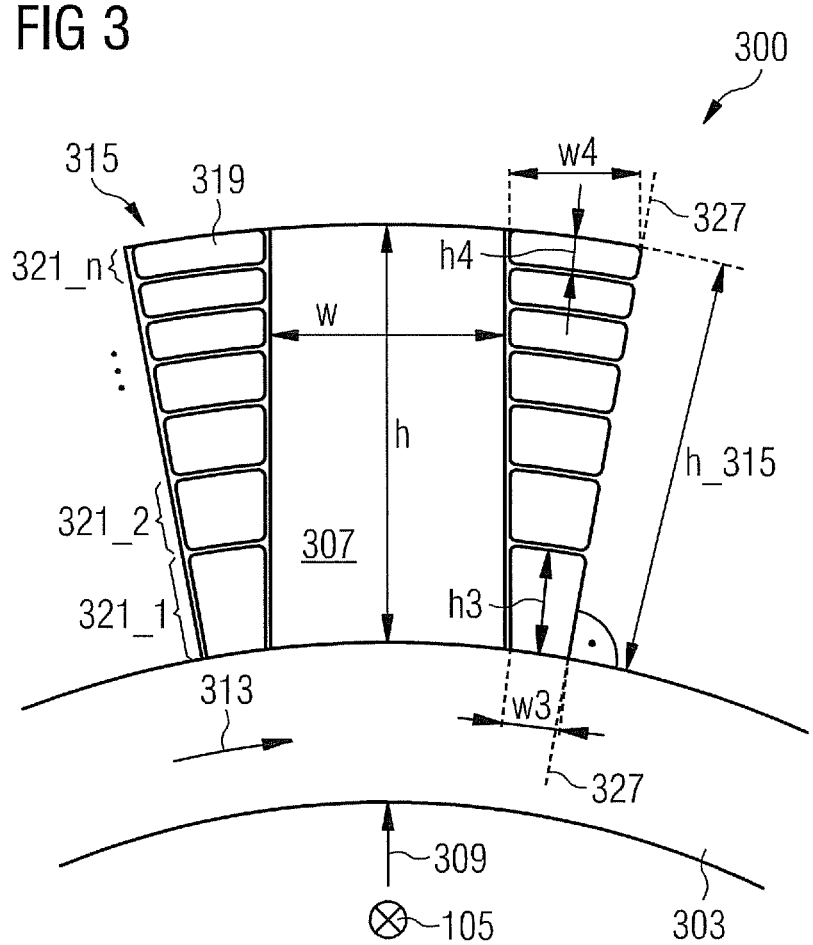

STATOR FOR AN ENERGY CONVERTING APPARATUS AND ENERGY CONVERTING APPARATUS USING THE SAME

CROSS REFERENCE TO RELATED APPLICATIONS

This application claims priority of European Patent Office application No. 10154877.4 EP filed Feb. 26, 2010, which is incorporated by reference herein in its entirety.

FIELD OF INVENTION

The present invention relates to a stator for an energy converting apparatus, to an energy converting apparatus comprising the same, to a wind turbine comprising the energy converting apparatus, and to a method for manufacturing a stator for an energy converting apparatus.

BACKGROUND ART

In the state-of-the-art an electrical generator is known to convert mechanical energy, such as rotational energy, into electrical energy. A generator makes use of Faraday's law which states that a voltage is induced between two points of a conductor, if a magnetic flux through an area encompassed by this conductor changes. For this, a conventional generator comprises a coil belonging to a stator and a moving magnet belonging to a rotor rotated by a mechanical energy source. Upon rotating the magnet relative to the coil a voltage is induced in the coil resulting to an electrical current which may deliver electrical energy. The stator part of the generator may comprise a ring-shaped structure from which a number of salient cores or protrusions protrude radially. On each of these salient cores a coil may be imposed. The wires constituting all these coils imposed on the salient cores may be connected to an appropriate circuitry to deliver electrical energy at an output of the circuitry.

It has been observed that conventional generators and energy converting machines in general may not have a sufficient efficiency.

There may be a need for a stator for an energy converting apparatus which can be used for an energy converting apparatus to improve the efficiency of the energy converting apparatus. Further, there may be a need for an energy converting apparatus having improved efficiency.

SUMMARY OF THE INVENTION

According to an embodiment, a stator for an energy converting apparatus in provided, the stator comprising a support structure providing at least a segment of an annular shape around an axial direction; a first protrusion coupled to the support structure and extending radially from the support structure; a second protrusion coupled to the support structure and extending radially from the support structure, the second protrusion being spaced apart from the first protrusion in a circumferential direction; and a first wire arranged between the first protrusion and the second protrusion in a plurality of first radial layers located at different radial positions and configured such that a circumferential extent of a cross-sectional area of the first wire increases radially outwards.

The stator may be suitable for an electrical motor or for an electrical generator. The support structure may be made of any material as long as it can withstand heat which may be generated by the current induced in the first coil and in the second coil, when the stator is in operation in a generator or an electrical motor. The support structure provides at least a segment of a portion of a ring shape and may in particular provide at least a segment of a circular shape. A number of segments, such as four, six or eight, may pairwise be connected to provide an annular structure.

The first protrusion coupled to the support structure and the second protrusion coupled to support structure may be integrally formed with the support structure or it (they) may be separate component(s) coupled to the support structure by coupling means such as bolts, screws and/or adhesive. The first protrusion and the second protrusion may also be welded to the support structure. The first protrusion and the second protrusion both extend radially from the support structure, i.e. they extend perpendicular to the axial direction, the axial direction being in particular a symmetry axis of the support structure. The first protrusion and/or the second protrusion may extend radially inwards or radially outwards from the support structure. For example, the first protrusion and the second protrusion may extend by 5 cm-10 cm from the support structure, thus they may have a radial extent or dimension between 5 cm-10 cm. Further, an axial extent or dimension of the first protrusion and the second protrusion may amount to between 3 cm and 10 cm. Further, a circumferential extent or dimension of the first protrusion and the second protrusion may amount to between 3 cm and 15 cm.

The stator may comprise more than two protrusions, for example 60 to 140 protrusions. Further, the stator may comprise the same number of coils coupled to respective protrusions or a different number of coils, wherein the coils may in either case be arranged around one or more protrusions.

The first wire may at least partly be wound or bent around one of the first protrusion or the second protrusion. The first wire may form a first coil enclosing one or more protrusions. A space between the first protrusion and the second protrusion may form a slot into which plurality of first radial layers may be inserted. The first radial layers may completely fill the slot (in the radial and/or the circumferential direction) in a so-called "one coil per slot"-arrangement, wherein a wire arranged between neighbouring protrusions belongs only to one coil. In contrast, in a so-called "two coils per slot"-arrangement, two wires may be arranged between neighbouring protrusions the two wires belonging to two coils. In this case only the two wires together may completely fill the slot (in the radial and/or the circumferential direction) between the first protrusion and the second protrusion.

The first wire (and the second wire, described below) may comprise a core made from a conductive material, such as copper, and an insulation layer which may cover the core. Due to the insulation layer covered onto the conductive core material of the wire adjacent windings of the first wire forming the first coil may be insulated from each other. Further, due to the insulation layer covering the conductive core material of the second wire (described below) plural windings of the second wire forming a second coil may be insulated from each other.

The stator comprises at least a first protrusion and a second protrusion the second protrusion being spaced apart from the first protrusion in a circumferential direction. The circumferential direction may be a direction perpendicular to the axial direction and also perpendicular to any radial direction. A radially extending element may specify an element which may extend in any radial direction, wherein each radial direction is perpendicular to the axial direction.

In particular, the circumferential extent of a cross-sectional area of the first wire may increase radially outwards from one first radial layer to the next first radial layer being located radially farther outwards. Thus, the circumferential extent of a cross-sectional area of the first wire may continuously (or monotonically) increase radially outwards.

Embodiments may solve the problem of increasing the "Slot-Fill-Factor" for a "trapezoid slot, rectangular protrusion"-stator (i.e. a stator having one or more protrusions extending radially and having rectangular shape between which slots having a trapezoid shape are formed). Thereby, the Slot-Fill-Factor may be a percentage of cross-sectional area of the slot which is filled with conductor material (copper) comprised in the wire, thus not including air (free space) and/or the isolation material around the wire windings belonging to one or more coils.

Another concept of stator construction may be a "rectangular slot, trapezoid tooth" construction which the present invention may not primarily address, since the slots of this construction may be filled out with wires having uniform cross-sectional shape.

Embodiments may relate to both one-layer and two-layer constructions i.e. one-layer construction where each slot is hosting wire windings from one coil only, and two-layer construction where each slot is hosting wire windings from two coils.

Embodiments may relate to both parallel- and series coil constructions i.e. the wire windings may be connected in series to form a multi-turn coil or the wire windings may be connected in parallel to form "multiple single-turn windings parallelly connected.

According to an embodiment the number of wire windings on top of each other (i.e. the number of radial layers being layers of the wire in the radial direction) may be in the range of 10 to 20 windings. As mentioned above these windings may be connected in parallel or in series. Other embodiments may provide a lower or greater number of radial layers.

According to an embodiment the number of wire winding layers in the circumferential direction (perpendicular to the radial direction) may be in the range of 1 to 2. Other embodiments may provide a lower or greater number of circumferential layers.

According to an embodiment the stator further comprises a second wire arranged between the first protrusion and the second protrusion in a plurality of second radial layers located at different radial positions, wherein a section of the first wire at a radially outer first radial layer is adjacent to a section of the second wire at a radially outer second radial layer, wherein in particular a circumferential extent of a cross-sectional area of the second wire increases radially outwards. Thereby, a "two coils per slot"-arrangement may be provided, wherein two wires are arranged between the first protrusion and the second protrusion, the two wires belonging to two different coils. In this case the first coil and the second coil together may completely (or along at least 90% of a radial extent of the protrusion) fill the slot (in both the radial and the circumferential direction) between the first protrusion and the second protrusion.

As mentioned above, the first wire may form a first coil and the second wire may form a second coil. In a cross-section of the stator by forming a section perpendicular to the axial direction the first coil and the second coil may extend radially and in the circumferential direction. Thereby, the first coil may comprise a radially inner portion and a radially outer portion which is arranged radially farther outwards (in particular representing a radially outermost portion) than the radially inner portion of the first coil. Analogously, the second coil may comprise a radially inner portion and a radially outer portion which is arranged radially farther outwards than the radially inner portion. In particular, the radially outer portion of the first coil may be formed by segments of the first wire which are arranged radially farthest outwards such as that radially farther outwards of these segments no other segments of the first wire may be present. Further, the outer portion of the second coil may be formed by segments of the second wire located radially farthest outwards such that radially farer outwards than these segments no other segments of the second wire are arranged.

The section of the first wire at the radially outer portion of the first coil may be immediately adjacent to the section of the second wire at the radially outer portion of the second coil such that no other structure (and also no empty space) may be in between this section of the first wire and this section of the second wire. In particular, a distance between the section of the first wire at the radially outer portion of the first coil from the section of the second wire at the radially outer portion of the second coil may be less than 5 times, 3 times, 2 times, or 1.5 times an average distance between adjacent sections of the first wire within the first coil or less than 5 times, 3 times, 2 times, or 1.5 times an average distance between adjacent sections of the second wire within the second coil.

Thereby, the first coil may immediately abut the second coil such that no gap is formed between the first coil and the second coil. Thereby, a hollow (air) space or a gap between the first protrusion and the second protrusion is avoided, but this gap is filled by segments of the first wire within the first coil and segments of the second wire within the second coil to allow induction of a current, when the stator is used for example in a generator. Thereby, the efficiency of the generator using the stator according to an embodiment may be improved. In particular, providing segments of the first wire and segments of the second wire at radially outer portions of the first coil and the second coil, respectively, may improve the efficiency of the generator, as these sections of the first wire and the second wire may be closer to magnets rotating around the stator and arranged radially outwards from radial outer ends of the coils, because a strength of the current induced in the first coil and the second coil may increase with decreasing distance to the rotating magnets.

According to an embodiment, the first wire and/or the second wire is configured to fill a space between the first protrusion and the second protrusion along at least 70% of a radial dimension (h) of the first protrusion and along at least 70% of a radial dimension (h) of the second protrusion, in particular along the entire circumferential extent between the first and the second protrusion.

Also, the first coil and the second coil may be configured to fill a space between the first protrusion and the second protrusion along at least 70% of a radial dimension of the first protrusion and along at least 70% of a radial dimension of the second protrusion.

The radial dimension of the first protrusion and the second protrusion may be measured as a length of the first protrusion and the second protrusion in a radial direction over which the first protrusion and the second protrusion extends radially from the support structure. In particular, the first protrusion and the second protrusion may comprise a respective radially inner end (in particular at which they are coupled to the support structure) and a respective radially outer end (in particular farther (or farthest) away from the support structure than the radially inner ends) between which the length of the respective protrusion may be measured.

The first protrusion and the second protrusion may have different shapes, such as a cylinder shape, cuboid shape resulting in different cross-sectional shapes, such as a rectangular shape, or a square shape. Further, they may exhibit a trapezoid shape, as long as they allow at least partly imposing a coil. In particular, a circumferential space between the first protrusion and the second protrusion along at least 90% of the radial dimension of the first protrusion and along at least 90% of the radial dimension of the second protrusion may be filled by segments of the first wire and/or the second wire.

According to an embodiment, the first coil and/or the second coil extends radially in the circumferential direction, wherein a circumferential dimension of the first coil and/or the second coil increases radially outwards. Advantageously, thereby, a gap between the first protrusion and the second protrusion may be filled by maximizing the circumferential dimension of the first coil and the second coil in particular at radially outer portions thereof in particular such that they abut each other (the constituting wire sections may be adjacent to each other or may even contact each other). Thereby, the strength of current induced in the first coil and the second coil, when the stator is used in a generator, may be enhanced improving the efficiency of the generator.

According to an embodiment, the first protrusion and the second protrusion protrude radially outwards. For a given diameter of the stator providing that the first protrusion and the second protrusion protrude radially outwards enhances an efficiency of a generator compared to the situation where the first protrusion and the second protrusion protrude radially inwards. Further, this construction may facilitate assembling the stator, as the first coil and the second coil may be more easily imposed on the first protrusion and the second protrusion, respectively.

According to an embodiment a size of a cross-sectional area of the first wire and/or the second wire is constant along a longitudinal extent of the respective wire. It is understood that due to variations and inaccuracies of a manufacturing process of the first wire and the second wire the cross-sectional area of the first wire and/or the second wire may not be absolutely constant, but may vary by a few percent not exceeding for example 10%, 5%, 2%, or 1%. The size of the cross-sectional area of the first wire and/or the second wire may be determined for the first wire and the second wire not assembled into the first coil and the second coil and before imposing the first coil and the second coil on the first protrusion and the second protrusion, respectively. Thus, the cross-sectional area of the first wire and the second wire may be determined immediately after manufacturing the first wire and the second wire but before assembling the stator. The cross-sectional area of the first wire and the second wire may be determined by measuring a size of an area of the respective wire perpendicular to its longitudinal extent.

Providing a constant size of the cross-sectional area of the first wire and the second wire may result in an at least approximately constant electrical resistance per length of the first wire and the second wire. Thereby, inhomogeneous heating of different segments of the first wire and the second wire is avoided, when currents are induced in the first coil and the second coil. Thereby, a maximum operational current may not be restricted by a particular segment of the first wire or the second wire having a smallest size of its cross-sectional area (and thus having a greatest electrical resistance resulting in highest heat dissipation).

According to an embodiment a dimension of the cross-sectional area of the first wire and/or the second wire in a predetermined cross-sectional direction varies (relative to an average cross-sectional area of the respective wire) along the longitudinal extent of the respective wire by more than 10%, in particular by more the 20%, in particular by more the 40%, in particular by more the 60%, in particular by more the 100%, in particular by more the 150%. The predetermined cross-sectional direction may be a direction within the plane defined by the cross-section, this plane being perpendicular to the longitudinal extent of the respective wire. The predetermined cross-sectional direction may for example represent a height of the first wire and the second wire or may represent a width of the first wire and the second wire. In particular, the predetermined cross-sectional direction may be perpendicular to a longitudinal extent of the first wire and the second wire, respectively.

Thereby, different cross-sectional shapes of the first wire and/or the second wire may be provided. Concurrently, the size of the cross-sectional area may be maintained unchanged according to an embodiment. Providing a first wire and/or a second wire having cross-sectional shapes varying along their respective longitudinal extents may advantageously facilitate filling the space or gap between the first protrusion and the second protrusion.

According to an embodiment the first wire and/or the second wire has a rectangular cross-sectional shape in at least a section thereof. In particular, the rectangular cross-sectional shape may represent a shape that is at least approximately rectangular. In particular, the approximately rectangular cross-sectional shape may have sharp edges or rounded edges. At least portions of the cross-sectional shape may be (at least approximately) straight portions, the straight portions being in particular connected by curved portions.

According to an embodiment the first wire and/or the second wire has a trapezoid cross-sectional shape in at least a further section thereof. In particular, the trapezoid cross-sectional shape may represent a shape that is at least approximately a trapezoid cross-sectional shape. In particular, the trapezoid cross-sectional shape may comprise sharp or rounded edges or corners. In particular, a first wire and a second wire having such a cross-sectional shape may be easily manufactured and may facilitate filling a space between the first protrusion and the second protrusion.

According to an embodiment the first coil and/or the second coil is formed by plural windings (in particular spaced apart in the circumferential direction) of the first wire and the second wire, respectively, the plural windings being located at different radial positions, where a first number of windings located at a first radial position is the same as a second number of windings located at a second radial position different from the first radial position.

The number of windings at a particular radial position (i.e. circumferential windings) may be between 1 and 6 according to an exemplary embodiment. Segments of the first wire and/or the second wire located at a particular radial position may have a same cross-sectional shape. By providing same numbers of windings of the first wire or the second wire and different radial positions may improve the inductive coupling and induction of current, when the stator is used in an electrical generator.

According to an embodiment it may not be possible to just add another circumferential winding layer in order to fill the free space between neighbouring protrusions, because the cross-sectional circumferential dimension (or cross-sectional width) of the wire windings may be bigger than the circumferential dimension of the remaining free space (i.e. not occupied by wire windings) between protrusions to be filled. Therefore, it may be necessary to provide a wire having varying cross-sectional shape.

According to an embodiment a minimum of the cross-sectional circumferential extent (or cross-sectional width) of the first wire (and/or the second wire described below) may be greater than 0.4 times, 0.45 times, 0.8 times, 0.9 time, 0.95 times a circumferential distance between a surface of the first protrusion and an opposing surface of the second protrusion taken at a radially inner end of the protrusions.

According to an embodiment a maximum of the cross-sectional circumferential extent (or cross-sectional width) of the first wire (and/or the second wire described below) may be greater than 0.4 times, 0.45 times, 0.8 times, 0.9 time, 0.95 times a circumferential distance between a surface of the first protrusion and an opposing surface of the second protrusion taken at a radially outer end of the protrusions.

According to an embodiment an energy converting apparatus is provided which comprises a stator according to an embodiment as described above and a rotor comprising a magnet element operable as a magnet, the rotor being rotatable relative to the stator. Thereby, an electrical motor or in particular an electrical generator may be provided according to an embodiment. Due to the improved construction of coils adjacent to each other filling a gap between adjacent respective protrusions current induced in the coils may be enhanced thereby improving the efficiency of the generator.

According to an embodiment a wind turbine is provided which comprises an energy converting apparatus according to an embodiment described above which is used as a generator for generating electrical energy, wind turbine comprising a propeller, wherein the propeller is mechanically coupled to the rotor. Due to the usage of a generator improved regarding its efficiency also the wind turbine may be improved regarding its efficiency to generate electrical energy.

The above features of some embodiments described with reference to system type claims may be applied to other embodiments relating to method type claims disclosed below.

According to an embodiment a method for manufacturing a stator for an energy converting apparatus is provided, wherein the method comprises forming an support structure having an annular shape around an axial direction; forming a first protrusion coupled to the support structure and extending radially; forming, spaced apart from the first protrusion in a circumferential direction, a second protrusion coupled to the support structure and extending radially; forming a plurality of first layers of a first wire; arranging the plurality of first layers of the first wire between the first protrusion and the second protrusion, wherein the finning and the arranging the plurality of first layers of the first wire is performed such that a circumferential extent of a cross-sectional area of the first wire increases radially outwards.

According to an embodiment the method may further comprise forming a plurality of second layers of a second wire; arranging the plurality of second layers of the second wire between the first protrusion and the second protrusion such that a section of the first wire at a radially outer first radial layer is adjacent to a section of the second wire at a radially outer second radial layer.

According to an embodiment the method may further comprise forming plural further protrusions, forming plural further coils and imposing the further coils on the further protrusions, respectively, wherein for each neighbouring and adjacent pair of coils a section of the first wire at a radially outer portion of the first coil of the pair of coils is adjacent to a section of the second wire at a radially outer portion of the second coil of the pair of coils. Thereby, gaps formed in a conventional stator between adjacent protrusions are filled by wire segments belonging to adjacent coils thus enabling improving an efficiency of an energy converting apparatus, such as a generator, when the stator according to this embodiment is used in operation of such a machine.

According to an embodiment the forming the plurality of first layers and/or second layers comprises shaping a cross-sectional area of the first wire and/or the second wire such that a dimension of the cross-sectional area in a predetermined cross-sectional direction varies along the longitudinal extent of the respective wire by more than 10%.

Further, the forming the first coil and/or the second coil may comprise shaping a cross-sectional area of the first wire and/or the second wire such that a dimension of the cross-sectional area in a predetermined cross-sectional direction varies along the longitudinal extent of the respective wire by more than 10%. Thereby, a rolling or milling process utilizing one or more pairs of opposite barrels or rollers, in particular oriented in different directions, may be employed which may be configured to deform the first wire and/or the second wire upon exerting pressure and/or draw to appropriately shape the cross-sectional area of the first wire and/or the second wire. In particular, the size of the cross-sectional area of the first wire and/or the second wire may be maintained at least approximately constant along a longitudinal extent of the respective wire.

According to an embodiment the forming the first layers and/or the second layers comprises bending the first wire and/or the second wire around an auxiliary structure plural times such that segments of the first wire and/or the second wire are stacked on top of each other and then bending the first wire and/or the second wire around the auxiliary structure at a different position plural times such that segments of the first wire and/or the second wire are stacked on top of each other.

Further, the forming the first coil and/or the second coil may comprise bending the first wire and/or the second wire around an auxiliary structure plural times such that segments of the first wire and/or the second wire are stacked on top of each other and then bending the first wire and/or the second wire around the auxiliary structure at a different position plural times such that segments of the first wire and/or the second wire are stacked on top of each other.

Thereby, the first wire and the second wire may have a respective constant cross-sectional shape across a longitudinal extent which corresponds to a sum of lengths of sections of the first wire and/or the second wire which are bent around the auxiliary structure at a particular position stacked on top of each other. Thereby, it is enabled to use a wire whose extent in the predetermined cross-sectional direction stepwise increases or decreases along its longitudinal extent. Thereby, segments of the first wire and/or the second wire having a particular cross-sectional shape may have a greater longitudinal extent compared to other winding procedures. Thereby, manufacturing of the first wire and the second wire may be simplified.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present invention will now be described with reference to the accompanying drawings. Elements or components similar in structure and/or function are denoted by similar reference signs.

FIG. 2b schematically illustrates a transverse cross-sectional view of the wire illustrated in FIG. 2a;

FIG. 3 schematically illustrates a part of a stator according to an embodiment.

DETAILED DESCRIPTION

Figure 1:
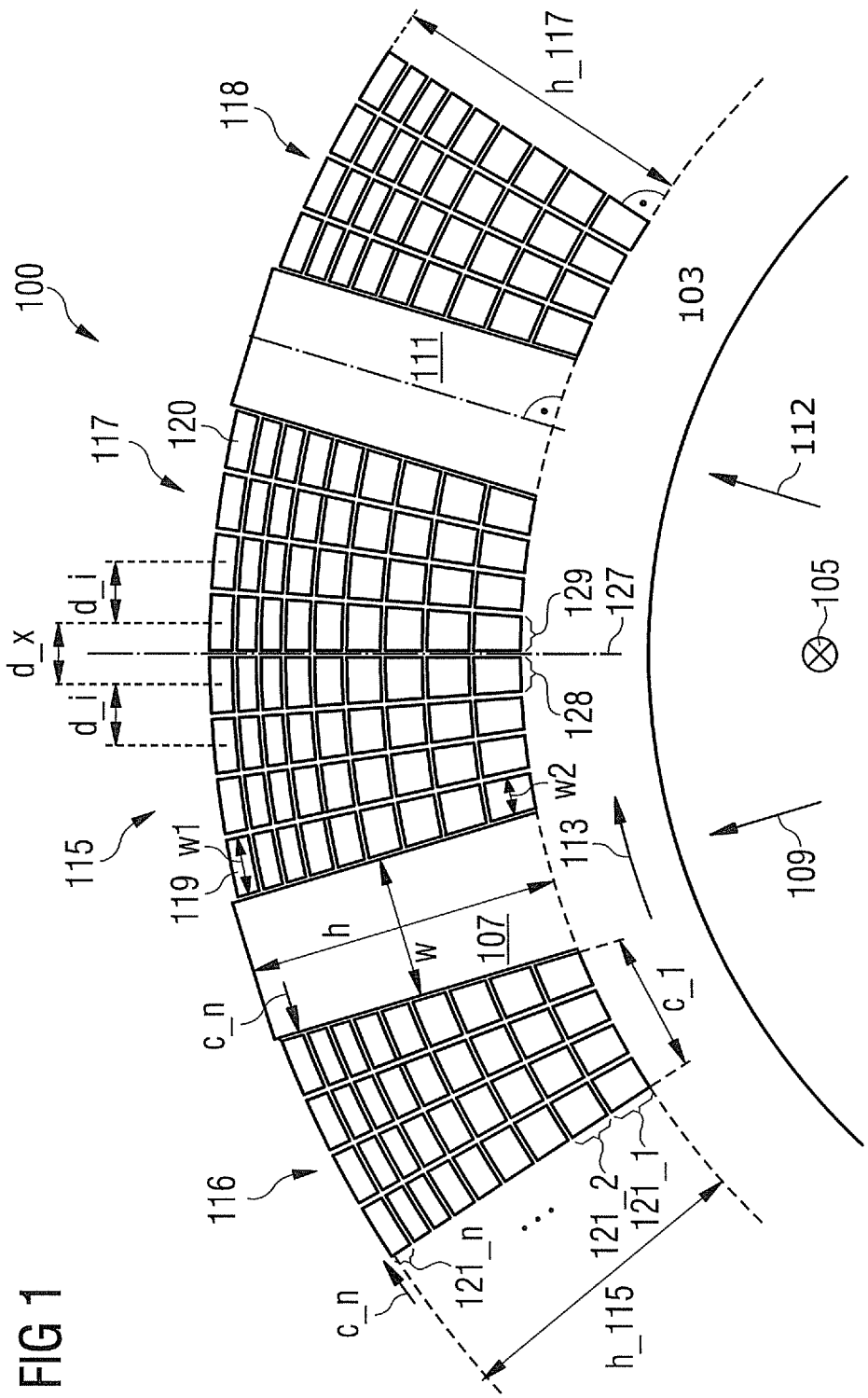
FIG. 1 schematically illustrates a cross-sectional view part of a stator according to an embodiment.

The illustration in the drawing is schematically. It is noted that in different figures, similar or identical elements are provided with the same reference signs or with reference signs, which are different from the corresponding reference signs only within the first digit.

FIG. 1 schematically illustrates a cross-sectional view of a stator 100 according to an embodiment. The stator 100 comprises a support structure 103 which has a ring shape being circular and having a symmetry axis (not illustrated in FIG. 1) which runs in an axial direction 105 perpendicular to the drawing plane of FIG. 1. The cross-sectional perspective view of part of the stator 100 in FIG. 1 corresponds to a cross-section perpendicular to the axial direction 105.

The stator 100 further comprises a first protrusion 107 which is coupled to the support structure 103 and extends radially outwards from the support structure 103. "Extending radially" means that the first protrusion extends in a radial direction 109 which is perpendicular to the axial direction 105, wherein the radial direction 109 is a direction originating from the not illustrated symmetry axis of the circular support structure 103 and running away from the symmetry axis perpendicular to the symmetry axis and thus also perpendicular to the axial direction 105. The stator 100 further comprises a second protrusion 111 also coupled to the support structure 103 and extending radially outwards from the support structure. In particular, the second protrusion 111 extends along the radial direction 113 being different from the radial direction 109.

In the cross-section illustrated in FIG. 1 the first protrusion 107 and also the second protrusion 111 has a rectangular shape having both a width w (extent in the circumferential direction 113) and a height h (extent in the radial direction 109 and 112, respectively) as indicated. In the illustrated exemplary embodiment a ratio between the height h and the width w is around 2 but the ratio may range between 5 and 0.5. The first protrusion 107 and the second protrusion 111 both have a (not illustrated) depth d (extent in the axial direction being perpendicular to the drawing plane) which may be in a similar range as the width w. In particular, the height h of the first protrusion 107 and the second protrusion 111 may amount to between 5 cm and 15 cm, and the width w and the depth d may both amount to between 3 cm and 8 cm according to exemplary embodiments. Other dimensions are possible and may depend on the intended application.

On the first protrusion 107 a first coil 115 is imposed and on the second protrusion 111 a second coil 117 is imposed. The coils 115 and 117 thereby at least partly are surround the protrusions 107 and 109 along their entire radial extent, respectively. The first coil 115 comprises a wire 119 arranged between the first protrusion 107 and the second protrusion and the second coil 117 comprises a wire 120 arranged between the first protrusion 107 and the second protrusion such that a plurality of radial layers $121\_1, 121\_2, \ldots, 121\_n$ are formed (illustrated exemplarily for a further coil 116 in FIG. 1), wherein n is an integer, which may be between 2 and 15. Thereby, the radial layer $121\_1$ is arranged in a radially inner portion of the first coil 115 and the second coil 117 and the last radial layer $121\_n$ is arranged at a radially outer portion of the first coil 115 and the second coil 117, respectively. It is noted that the first coil and also the second coil may surround one or more protrusions each. Another coil 118 is provided.

In the sectional view of FIG. 1 the first coil 115 as well as the second coil 117 has a wedge-like shape such that their extents or dimensions in the circumferential direction 113 increases radially outwards. Exemplarily indicated in FIG. 1 are the circumferential extent $c\_1$ of the inner radial layer $121\_1$ and the circumferential extent $c\_n$ of the radially outer radial layer $121\_n$ of the first coil 115. It is apparent that the circumferential extent $c\_1$ of the radially innermost layer $121\_1$ is smaller than the circumferential extent $c\_n$ of the radially outermost layer $121\_n$. Circumferential extents of radial layers $121\_2, \ldots, 121\_(n-1)$ may amount to between $c\_1$ and $c\_n$.

In the illustrated stator 100 in FIG. 1 the change of the circumferential extent of the coils 115 and 117 in a direction radially outwards is achieved by using a wire 119 forming the first coil 115 and a wire 120 forming the second coil 117, wherein the wire 119 as well as the wire 120 exhibits a cross-sectional shape which varies along a longitudinal extent of the wire 119 and the wire 120, respectively. It is apparent, that a circumferential extent (extent or dimension in the circumferential direction 113) of a cross-sectional area of the first wire 119 increases from a value w2 at a radially inner layer $121\_1$ to a value w1 at a radially outer layer $121\_n$, wherein w2 is greater than w1. In particular this increase may be continuous or proportional to the radial position.

Figure 2A:
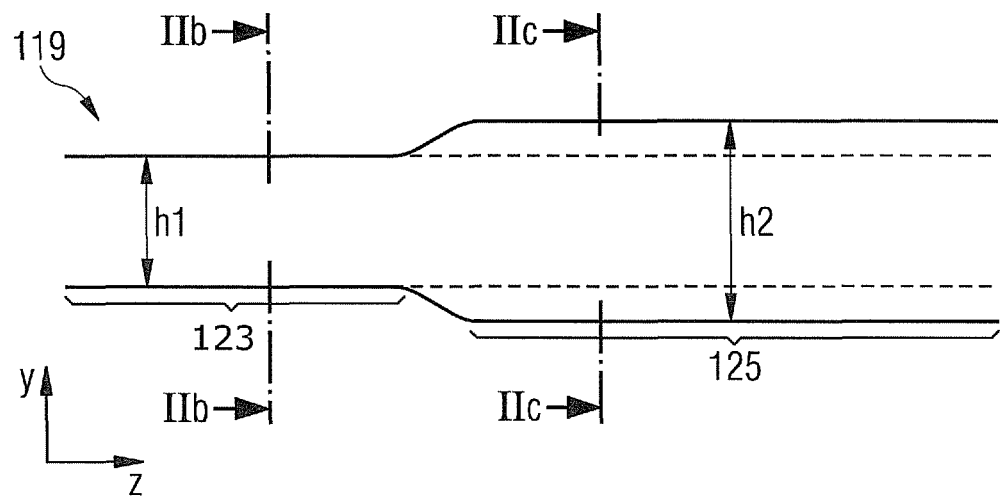
FIG. 2a schematically illustrates a longitudinal cross-sectional view of a wire according to an embodiment.

With reference to FIG. 2a the wire 119 is schematically illustrated in a longitudinal cross-sectional view. The wire 120 may have same or different geometrical properties. In the FIG. 2a the direction of the longitudinal extent of the wire is in the z-direction. The wire 119 comprises a section 124 spanning a portion of its longitudinal extent and comprises a section 125 spanning another portion of its longitudinal extent. As is illustrated in FIG. 2a, a height h1 of the wire 119 in the segment 123 is smaller than a height h2 of the wire 119 in the other segment 125. In particular, the height h2 is about 25% greater than the height h1. In other embodiments the ratio between the height h2 and the height h1 may amount to between for example 5 and 1.

Figure 2B:
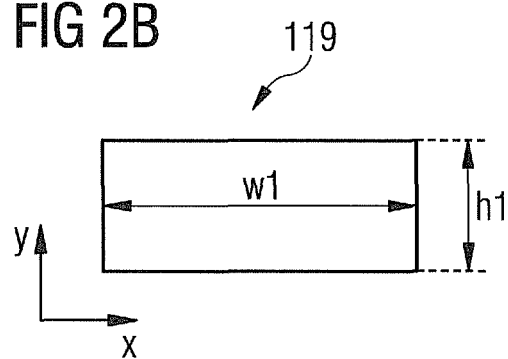
Figure 2C:
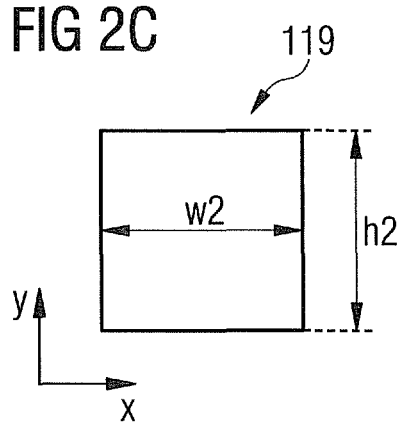
FIG. 2c schematically illustrates a transverse cross-sectional view of the wire illustrated in FIG. 2a at another longitudinal position of the wire.

FIG. 2b schematically illustrates a transverse cross-sectional view of the wire 119 in the segment 123, the cross-sectional view being perpendicular to the direction z of the longitudinal extent of the wire 119. FIG. 2c in turn schematically illustrates a transverse cross-sectional view of the wire 119 in the segment 125. As is apparent from FIGS. 2b and 2c, the width of the wire 119 in the segment 123 (illustrated in FIG. 2b in a cross-section) is different than in segment 125 (illustrated in FIG. 2c in a cross-section). While in the section 123 the width of the wire 119 is w1, the width of the wire 119 in the segment 125 is w2 which is smaller than w1. Thus, while in the segment 123 the height of the wire 119 is smaller than in the segment 125, the width in the segment 123 is greater than in the segment 125.

In particular, the product of the width w1 and the height h1 equals the product of the width w2 and the height h2. Thus, a size of the cross-sectional area of the wire 119 in the segment 123, i.e. w1*h1, is equal to the cross-sectional area in the segment 125, i.e. w2*h2. The wire 119 may have a constant size of its cross-sectional area along its entire longitudinal extent. Advantageously, when using such a wire for forming coils in the stator 100 illustrated partially in FIG. 1, the wire 119 will exhibit a constant resistance per longitudinal unit length, when a current is induced by a rotating magnet rotating radially outwards from the radially outermost radial wire layer 121_n. Thereby, inhomogeneous heating of the wire 119 comprised in the coils 115 and 117 may be avoided.

The wire 119 (and/or wire 120) schematically illustrated in FIGS. 1, 2a, 2b and 2c at least approximately has a rectangular shape having varying height and varying width along its longitudinal extent. In particular, in a cross-section the rectangular shape may comprise rounded edges or corners, wherein the rounding may comprise differing chamfer radii. Further, the wire 119 may comprise a conductive inner core made from a metal, such as copper, which may be covered by an insulating layer such that the individual windings of the wire 119 and 120 in the coils 115 and 117, respectively, are electrically insulated from each other.

Again referring to FIG. 1 it is apparent that a space between the first protrusion 107 and the second protrusion 111 is entirely filled by the wire 119 forming the coil 115 and the wire 120 forming the coil 117. In particular, the radial wire layers 121_1, 121_2, . . . , 121_n span a radial extent h_115 for the first coil 115 and h_117 for the second coil 117 which equals the height h of the first protrusion 107 and the second protrusion 111.

In particular, the first coil 115 abuts the second coil 117 at an interface 127 which is located half between the first protrusion 107 and the second protrusion 111 and including a radial direction. In particular, the first coil abuts the second coil 117 along its entire radial extent h_115 such that no gap is formed between the first coil 115 and the second coil 117. Thereby, circumferentially outermost (close to interface 127) segments of the wire 119 forming the first coil 115 are immediately adjacent to circumferentially outermost (close to interface 127) segments of the wire 120 forming the second coil 117. Herein, the circumferentially outermost segments of the wire 119 forming the first coil 115 are labelled by reference sign 128 and the circumferentially outermost segments of the wire 120 forming the second coil 117 are labelled by reference sign 129. As is further apparent from FIG. 1 the number (four in the illustrated embodiment) of circumferential segments of the wire 119 stacked on top to each other in a particular radial layer 121_1, 121_2, . . . , 121_n does not change from one radial layer to another radial layer. Although the number of segments of the wire 119 in one radial layer does not change for different radial positions the circumferential extent of a radial layer increases radially outwards due to the changing cross-sectional shape of the wire 119. In particular, the height of the wire in the radially innermost layer 121_1 is larger than the height of the wire in the radially outermost layer 121_n, while the width behaves the other way round.

A distance d_x between segments of the wire 119 in the circumferentially radially outermost portions of the first coil 115 and segments of the wire 120 in the circumferentially and radially outermost portions of the second coil 117 is smaller than 3 times, in particular 2 times, in particular 1.5 times an average distance d_i of neighbouring wire segments within the first coil 115 or within the second coil 117.

FIG. 3 schematically illustrates another embodiment of a stator 300 in a cross-sectional view perpendicular to the axial direction 105. The stator 300 comprises a support structure 303 and a plurality of protrusions from which only one protrusion 307 is illustrated. The protrusion 307 is mounted at the support structure 303 and extends radially outwards. A coil 315 is imposed on the protrusion 307. The coil 315 is formed by a wire 319 which has a cross-sectional shape that varies along its longitudinal extent. In particular, the wire 319 has a trapezoid cross-sectional shape having a height h3 and a width w3 at a radially inner layer and having a height h4 and a width w4 at a radially outer layer of the wire 319. As is apparent the height h3 is greater than the height h4 and the width w3 is smaller than the width w4. In particular, a size of a cross-sectional area may be constant along the longitudinal extent of the wire 319. While in FIG. 3 only one circumferential layer comprising seven radial segments of the wire 319 which are radially spaced apart are shown, other embodiments may comprise plural circumferential layers of the wire 319, similar as illustrated in FIG. 1.

Due to the trapezoid shape of the cross-sectional area of the wire 319 exhibiting varying height and width a circumferential end of the coil 315 abuts an interface 327. Another coil not illustrated in FIG. 3 abuts this interface 327 from the other side such that a space between neighbouring protrusions may be entirely filled by adjacent wire segments of neighbouring coils.

Whereas FIG. 1 has illustrated a "two coil per slot"-arrangement, it can be modified in the following way:

According to an embodiment a "one coil per slot"-arrangement is provided, wherein a wire arranged between neighbouring protrusions belongs only to one coil. In this case the wire 119 and the wire 120 in FIG. 1 together form a single wire belonging to a single coil. In particular, the single coil may be formed by a single circumferential layer instead of eight circumferential layers as illustrated in FIG. 1. Thereby only one single wire is arranged between the first protrusion 107 and the second protrusion 109, wherein a circumferential extent of a cross-sectional area of this single wire increases radially outwards to completely fill the space between the neighbouring protrusions. In a region behind the drawing plane of FIG. 1 the wire may cross with other wires belonging to other coils (not illustrated). All feature described with reference to a "two coil per slot"-arrangement may also be applied to such a "one coil per slot"-arrangement.

The stators illustrated in FIG. 1 and FIG. 3 may advantageously be used as stators in a generator for generating electrical energy. In this case rotating magnets, for example permanent magnets, arranged radially outwards from the protrusions and coils and rotating around the symmetry axis of the support structure 103 or 303 may induce a current in the coils due to a changing magnetic flux. Due to the filled gap between neighbouring protrusions the areas of the coils are increased (in particular maximized) compared to a situation where a gap is left between adjacent coils, thus resulting in a higher efficiency of the generator.

Such a generator may in particular be employed in a wind turbine, wherein the rotor comprising the magnets is mechanically coupled to a propeller comprising a number of wind blades.

Embodiments of the present invention provide methods for manufacturing a stator as illustrated in FIG. 1 or 3. Thereby, a coil used for the stator may be formed using an auxiliary structure. Thereby, a wire is bent around the auxiliary structure plural times such that segments of the wire stack on top of each other. Such a stack of wire segments may then correspond for example to the radially innermost (or, alternatively, outermost) radial wire layer 121_1, as illustrated in FIG. 1. Advantageously, this layer 121_1 may comprise wire segments having at least approximately a same cross-sectional shape having same heights and same widths. In a next step a further stack of wire segments may be formed by bending the wire around the auxiliary structure at a different position plural times. Thereby, the radial layer 121_2, as illustrated in FIG. 1, may be formed which again may comprise wire segments having substantially a same cross-sectional shape and having same heights and same widths. Further, the process of forming plural additional stacks of wire segments may continue until a last stack of wire segments is formed corresponding to the radially outermost layer 121_n, as illustrated in FIG. 1. Finally, the thus formed coil may be imposed on one of the protrusions of the stator 100.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

1. A method for manufacturing a stator for an energy converting apparatus, the method comprising:
    forming an support structure having an annular shape around an axial direction;
    forming a first protrusion coupled to the support structure and extending radially;
    forming, spaced apart from the first protrusion in a circumferential direction, a second protrusion coupled to the support structure and extending radially;
    forming a first coil from a plurality of first radial layers of a first wire;
    imposing the first formed coil on the first protrusion,
    wherein the forming and the arranging the plurality of first layers of the first wire is performed such that a circumferential extent of a cross-sectional area of the first wire increases radially from a value at a radially innermost layer of the first radial layers to a value at a radially outermost layer of the first radial layers
    the forming of the first radial layers comprises:
        bending the first wire around an auxiliary structure a plurality of times such that the radially innermost layer is formed, and
        bending the first wire around the auxiliary structure at a different radial position a plurality of times such that a radial layer of the first radial layer is formed after a previously from layer until the radial outermost layer is formed.

2. The method according to claim 1, further comprising:
    forming second coil from a plurality of second radial layers of a second wire; and
    imposing the second coil on the second protrusion such that a section of the first wire at a radially outer first radial layer is adjacent to a section of the second wire at a radially outermost second radial layer.

3. The method according to claim 1, wherein the forming the first and/or second coils comprises shaping a cross-sectional area of the first wire and/or the second wire such that a dimension of the cross-sectional area in a predetermined cross-sectional direction varies along the longitudinal extent of the respective wire by more than 10%.

* * * * *